June 21, 1966  O. ZAUNER  3,257,186
METHOD OF AND APPARATUS FOR RESHAPING GLASS TUBES
Filed Aug. 6, 1962 4 Sheets-Sheet 1

INVENTOR.
OTTO ZAUNER
BY E. J. HOLLER
W. A. SCHAICH
ATTORNEYS

INVENTOR.
OTTO ZAUNER
BY E. J. HOLLER
W. A. SCHAICH
ATTORNEYS

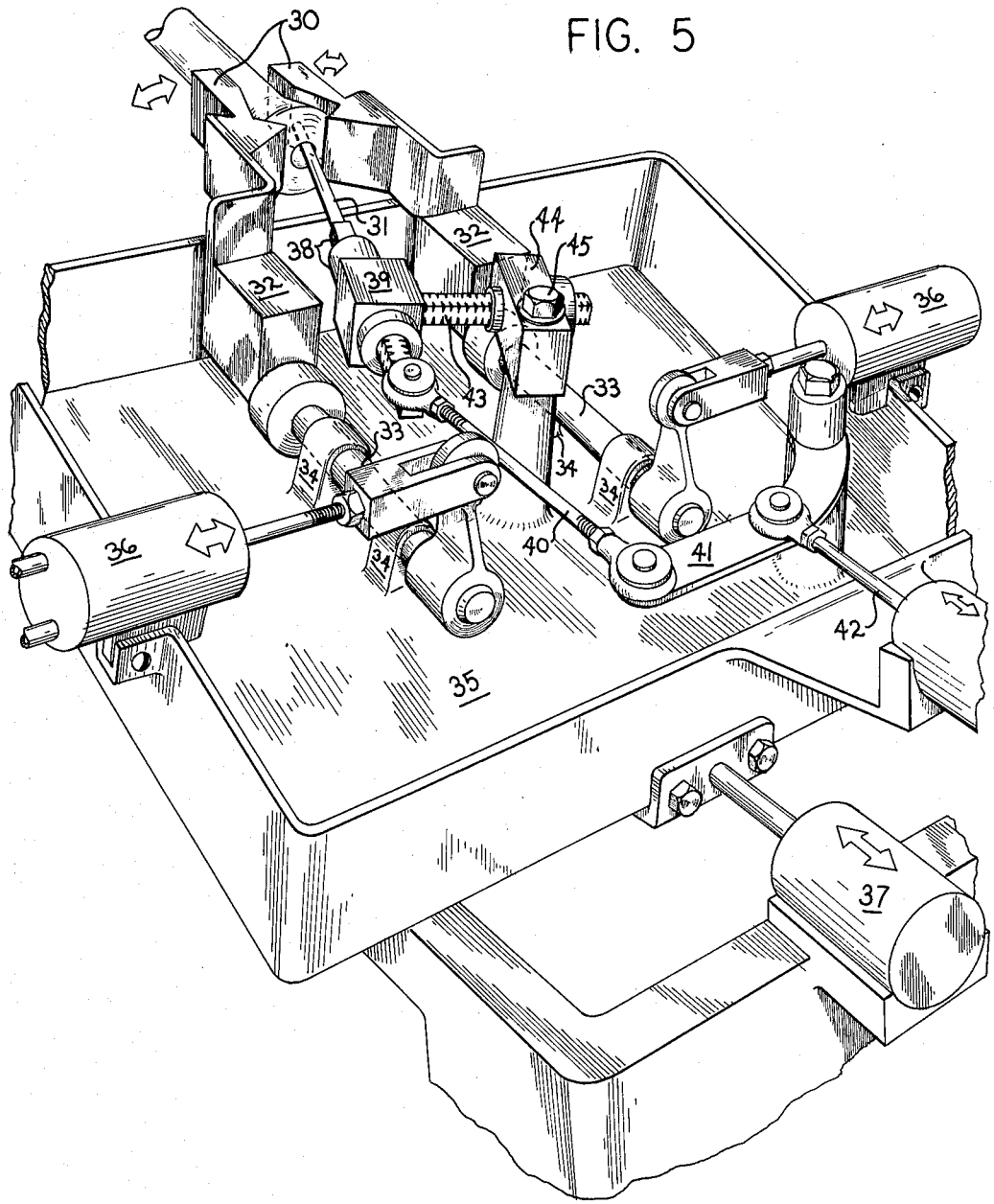

June 21, 1966  O. ZAUNER  3,257,186
METHOD OF AND APPARATUS FOR RESHAPING GLASS TUBES
Filed Aug. 6, 1962  4 Sheets-Sheet 4
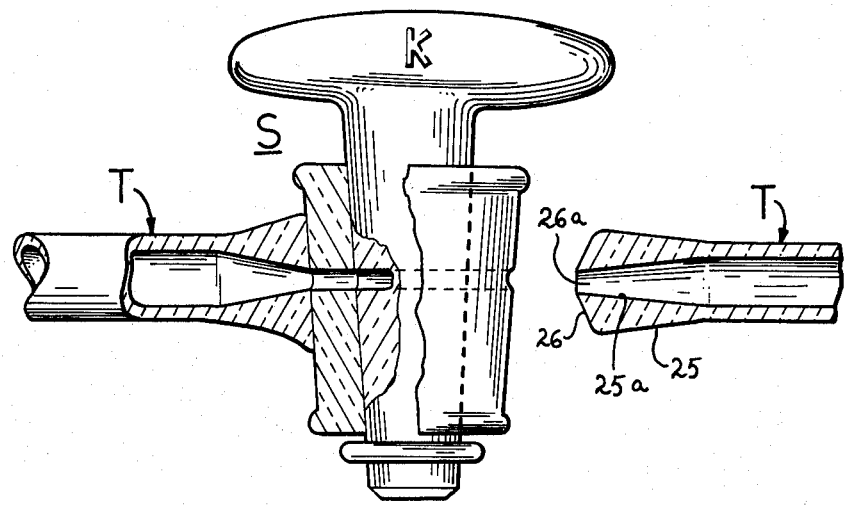
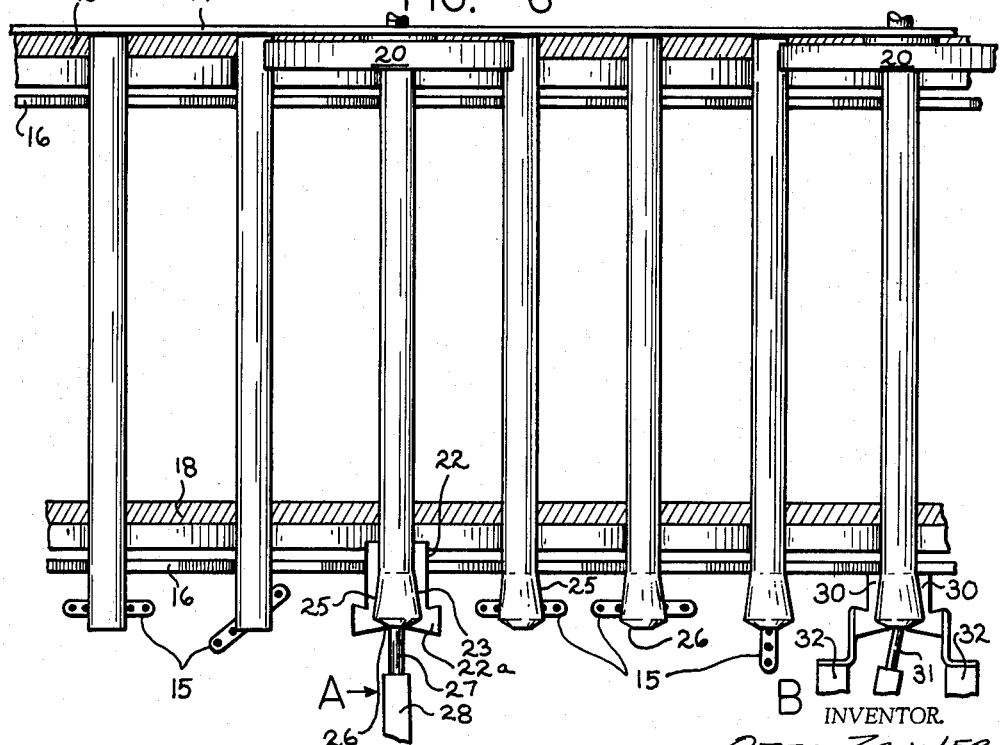
INVENTOR.
OTTO ZAUNER
BY E. J. HOLLER &
W. A. SCHAICH
ATTORNEYS.

United States Patent Office 3,257,186
Patented June 21, 1966

3,257,186
METHOD OF AND APPARATUS FOR RESHAPING GLASS TUBES
Otto Zauner, Vineland, N.J., assignor, by mesne assignments, to Owens-Illinois Glass Company, Toledo, Ohio, a corporation of Ohio
Filed Aug. 6, 1962, Ser. No. 214,954
6 Claims. (Cl. 65—109)

My invention is an improved method of and apparatus for reshaping glass tubes preparatory to assembling them with other glass parts and the novel product of such assembling.

In the commercial production of glass tubing and assembling lengths thereof with other glass parts, such for example as stopcock barrels, one accepted procedure has been to take a tube of the desired length, either with or without a beaded end, heat such end to its softening point and press it axially against a similarly softened or heated surface surrounding a port in the barrel of a stopcock. Cooling of the glass produced a joint in which the surface area of the bond was determined largely by the wall thickness of the tubing, or the bead dimension. Thus it is evident that with thin-wall tubing the resultant joint between it and other parts might very well lack the essential strength and dependability.

Also, because it is not commercially economical to produce tubing in such a wide dimensional range, with regard to internal tube diameter, as to permit perfect matching of the tube bores and ports in stopcock barrels, for example, certain exceedingly objectionable conditions have been created. Ideally, the tube bore should be the same diameter as the port or ports. Generally, however, it is greater, with the result that the wall surrounding the entrance to the port creates a baffle or dam interfering with free, smooth flow of liquids and causing the introduction of highly objectionable turbulence. Further, such a baffle may very well create a pocket in which small quantities of foreign matter accumulate. That, of course, cannot be tolerated.

It is therefore an important object of my invention to simply, yet effectively overcome all of the above-noted objections without adversely affecting production speeds, etc.

Another object of my invention is the provision of glass tubing in which the ends which are to be "glass-sealed" to other parts are enlarged and flared in such fashion as to materially increase the surface area of the bond, or joint, and concurrently therewith so contour the tube bore at and near the tube end as to insure smooth, even flow of liquids or gases therethrough.

A further object of my invention is the provision of a novel method of and apparatus for reforming the end or ends of glass tubing to produce the above-indicated results.

It is also an object of my invention to provide a novel, exceptionally strong joint between a glass tube and ported glass part wherein the bond area is exceptionally large while the end of the bore precisely matches the port of the glass part dimensionally.

It is likewise an object of my invention to provide tube bore forming apparatus in which lengths of glass tubes move to and beyond end heating and softening and reshaping stations and at one of these stations is so tooled internally as to create an inverse taper in the end zone leading to a port or end opening which concurrently is shaped and dimensioned to meet specified requirements.

Other objects will be in part apparent and in part pointed out hereinafter.

In the accompanying drawings:
FIG. 1 is a fragmentary perspective view showing my invention incorporated in glass tube handling apparatus;

FIG. 5 is a perspective view more clearly illustrating the apparatus shown in FIGS. 3 and 4;

FIG. 6 is a top plan view; and

FIG. 7 is a sectional elevational view showing a glass stopcock with one tube about to be joined to the barrel and another tube already bonded thereto.

In FIG. 7 I have illustrated an article of manufacture, a conventional stopcock S, incorporating lengths of glass tubing T, each of which has been produced in accordance with the teachings of my invention. As a consequence, it will be observed, the tube bores and stopcock barrel ports are of the same diameter and properly aligned; the bore is gradually tapered adjacent the port to insure free, smooth liquid flow; and because of the substantial external flare at the tube end and reduction of the bore diameter within the flared section, the surface area of the joint is materially enlarged to produce an exceptionally strong connection, highly resistant to breakage.

The method and apparatus which I utilize in shaping the tube end illustrated in FIG. 7 provide for first enlarging and flaring the end of a tube, locally reducing the bore diameter at said end and reshaping the bore to such extent that a straight tapered section joins the bore wall proper and the opening at the tube end.

In its preferred form the apparatus may well comprise a walking beam type conveyor C disposed horizontally and operating to advance lengths of glass tubing T in step-by-step fashion to a succession of stations, at some of which flame heaters 15 effect localized softening of the glass, while at other stations, devices to be described, reshape and tool the softened glass.

Figure 1:
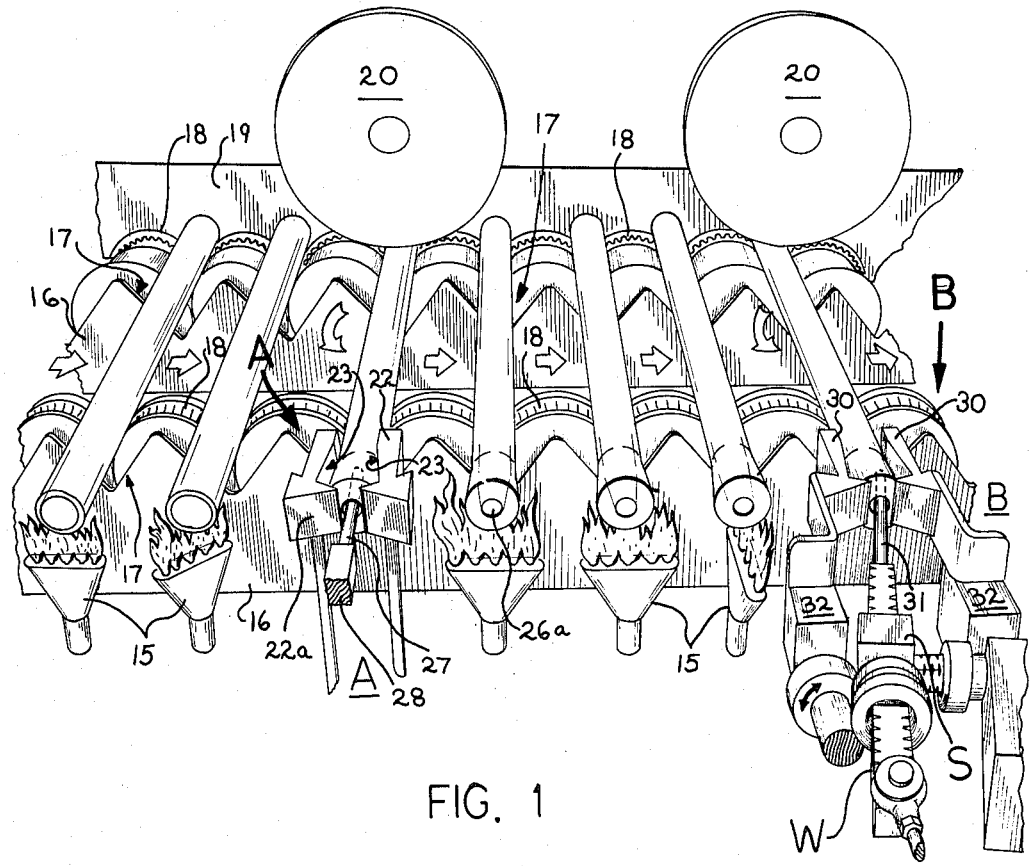
Figure 2:
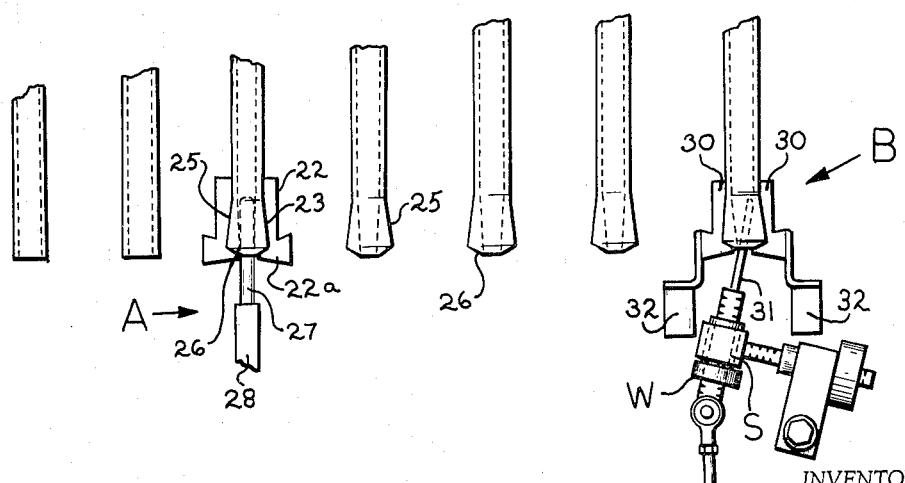
FIG. 2 is a plan view of a fragment of the mechanism illustrated in FIG. 1.

The walking beam conveyor, as shown, is of conventional form and comprises a pair of laterally spaced-apart parallel beams 16 or bars. These beams are disposed horizontally and extend longitudinally of the path to be followed by the tubes. These beams have transversely aligned V-notches 17 along their upper edges, such notches accommodating the tubes T, as shown best in FIG. 1. Conventional mechanism (not shown) elevates the beam in unison and reciprocates them in the customary manner to thereby advance each tube T a distance equal to the spacing between the bottoms of adjacent notches. With each such advance the beams 16 place the tubes upon supporting rollers 18, these being arranged in two longitudinal rows near the beams and in transversely aligned pairs. Thus as each tube is released by the beams 16 it comes to rest in contact with the periphery of four rollers 18, preparatory to either heating or tooling. A back plate 19 or bar positioned at that side of the conveyor opposite the heaters 15 limits axial movement of the tubes and insures proper positioning of same relative to the heaters. Tube rotating rollers 20 are arranged above the conveyor for the purpose of rotating the tubes about their axes at the reshaping stations A and B, (FIG. 1). These rollers 20 are of conventional type used widely in tube fabricating operations and as shown each may be mounted upon a horizontal shaft 21 whose axis is not quite parallel with that of the tubes being worked upon. Thus at each station A and B, the tubes T are not only rotated by said rollers 20 but also are being urged axially against forming tools at said stations, as will be apparent.

At station A is a pair of opposed anvils 22 or jaws each having glass marvering or shaping surfaces 23 of generally L-shape. These jaws close about the previously softened tube end and with rotation of the tube by one of the rollers 20 this end is enlarged substantially and has imparted thereto a distinct external flare 25. These jaws are actuated by any suitable mechanism (not shown) operating in synchronism with the advance of the tubes T. The foot 22a of each anvil 22 is of such length and so angularly formed that together these feet impart to the extreme end of the tube contiguous to the flare, a generally frusto-conical extension 26. This, as will appear hereinafter, aids materially in creating an effective joint. In addition to the anvils 22 there is a rod-like tool 27 which is mounted upon a reciprocable carrier 28 for movement generally axially into the tube bore. This tool 27 insures maintenance of an opening 26a at the flared end of the tube of diameter to accommodate a bore-tooling rod at the next reshaping station B.

At this station B the previously flared tube end is grasped by another pair of anvils 30, or jaws, while the bore interior at said end is finally shaped to provide a straight reverse taper 25a radially inwardly of the flare 25. This taper is formed by means of an elongated rod-like tool 31 mounted so that its axis is at an acute angle to the tube axis. Tool 31 has a lesser diameter than tool 27. The second pair of jaws or anvils 30 serve to flare the exterior surfaces of the tube end portion slightly further into final contour.

Figure 3:
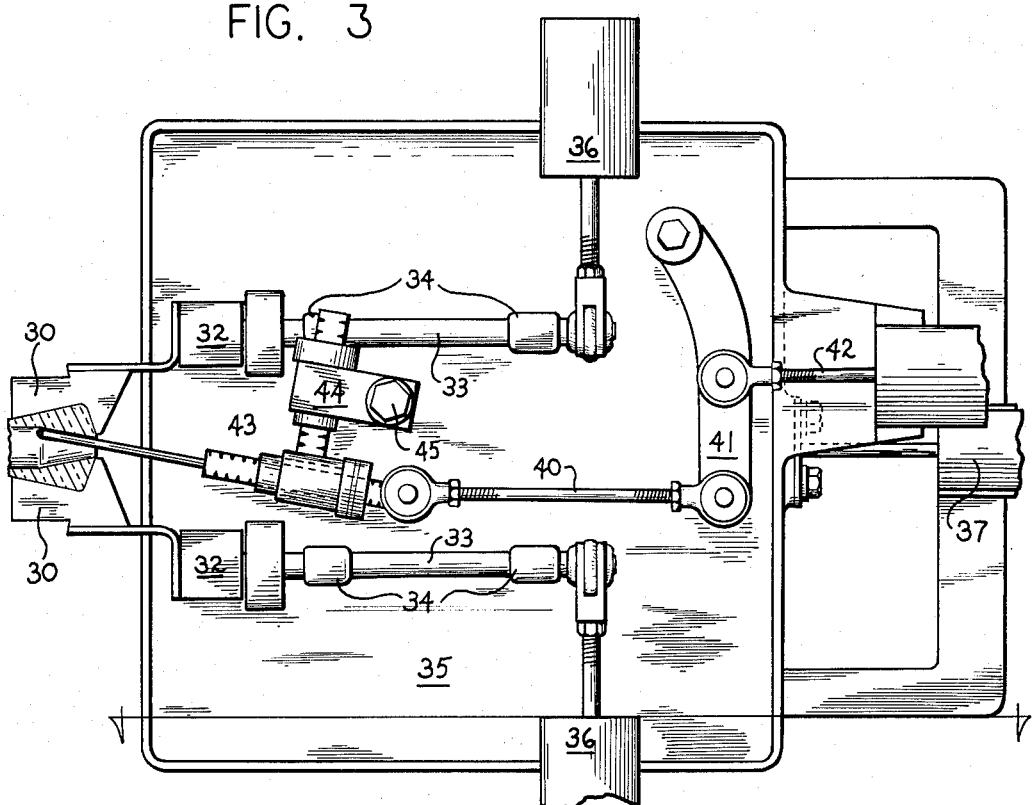
FIG. 3 is a top plan view of the apparatus for actuating the final bore forming tool which appears at the right-hand side of FIG. 1.
Figure 4:
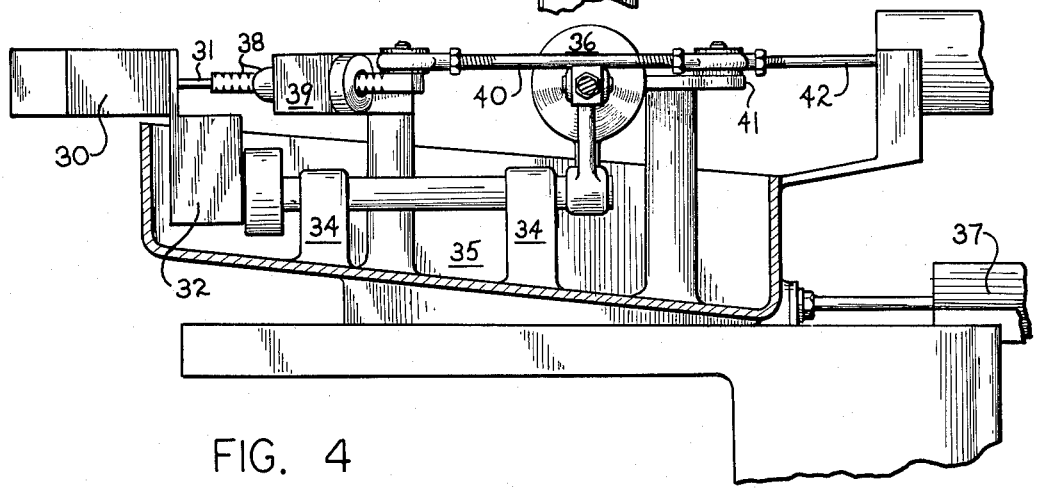
FIG. 4 is a sectional elevational view taken substantially along the plane of line 4—4 of FIG. 3.

The anvils 30, at the second station B, are similar to the anvils 22 as to the marvering surface contour. These anvils are mounted for radial relative movement into and out of contact with the tube and for movement generally axially relative to the tube. The mechanism involved (FIGS. 3-5) comprises anvil holders 32 carried by a pair of parallel horizontal rock shafts 33 which are journaled in bearings 34 rising from the floor of a pan 35. Piston motors 36 rock the shafts in timed relation to horizontal reciprocation of the pan 35 which carries the anvils 30 and tool 31. A piston motor 37 connected to the pan functions to effect such reciprocation.

The bore tapering tool 31 is fixed to a holder 38 which is axially slidingly mounted in a horizontal guide 39 and connected through an axially adjustable link 40 to a lever 41. This lever 41 is pivoted to an end of a piston rod 42 forming part of a piston motor 43 which, as is apparent, functions to move the tool 31 into and out of the tube bore. The angle of the bore taper 25a within the flare 25 is determined by the angular position of the tool 31 relative to the axis of the tube being worked upon. Accordingly the guide 39 (FIGS. 3-5) is capable of multi-directional adjustment as circumstances demand. The guide is adjustable along the axis of a holder 43 by moving the latter horizontally in the bracket 44, the latter in turn being pivoted to a vertical hinge pin 45. Thus both the bodily position of the tool 31 relative to the conveyor and its angular position relative to the tube axis are regulatable and capable of accurate setting.

Tool 31 is introduced into the tube open end to form the tapered bore 25a while the tube end is retained by the pair of jaws or anvils 30. Tool 31 is withdrawn from the tube end prior to separation of the jaws from contact with the flared exterior surfaces. After the jaws are pivoted apart, pan 35 is moved away from the tube end a distance slightly greater than the extent of the jaw working surface. The next tube to be finally formed is then advanced to station B with simultaneous advance of a heat-softened blank tube to station A.

Modifications may be resorted to within the spirit and scope of the appended claims.

I claim:

1. The method of shaping the end of a glass tube which comprises
   heating and softening the end of a glass tube,
   shaping the end and adjacent areas of said tube to form an enlarged flanged end and to reduce the bore diameter of the end of the tube,
   thereafter closing jaws having flared surfaces about the end of said tube,
   inserting a tool within the bore,
   rotating said tube relative to said tool and said jaws,
   moving said tool so that a forming surface thereof forms an angle with the axis of the bore to shape the internal surface of the tube adjacent the end of the tube such that the bore opening converges toward the free end of the tube.

2. The method of shaping the end of a glass tube which comprises
   heating and softening the end of a glass tube,
   continuously rotating the tube,
   inserting a tool within the end of the tube,
   closing jaws with flared shaping surfaces about the end of the tube,
   rotating the tube while it is so clamped with the tool within the bore in the end of the tube to form an enlarged flared end on said tube and reduce the bore diameter of the end of said tube,
   thereafter closing jaws with more pronounced flared shaping surfaces about the enlarged end of the tube,
   inserting a tool within the end of the bore,
   rotating the glass tube relative to said tool and said jaws,
   and moving said tool so that a forming surface thereof forms an angle with the axis of the bore to shape the internal surface of a bore opening adjacent the end of the tube such that the bore opening converges toward the end of the glass tube.

3. In an apparatus for shaping the end of a glass tube, the combination comprising
   means for moving a tube in step-by-step fashion along a generally horizontal path past a plurality of stations,
   heating means at some of said stations for heating the end of a tube to its softening point,
   tube end reshaping means at a station comprising anvil means having outwardly flared surfaces for grasping the end of the tube,
   a rod-like bore reshaping tool insertable into the end of said tube and having a shaping surface at an acute angle to the axis of the tube,
   means for rotating the tube about its axis relative to the anvil means and the tool,
   means for axially moving the tube bodily toward said anvil means and said tool,
   such that the end of the tube is flared and the bore of said tube is shaped to converge toward the end of the tube.

4. In apparatus as defined in claim 3 including means for inserting the tool into the tube bore at the flared end with the axes of the tube and tool forming said acute angle and means for closing the anvil means into contact with the glass prior to insertion of the tool.

5. The combination set forth in claim 3 including a common support on which said anvil and said reshaping tool are mounted,
   said support being movable toward and away from the end of the tube.

6. The combination set forth in claim 5 including means for moving said anvil means independently of said tool, and means for moving said tool independently of said anvil means.

References Cited by the Examiner

UNITED STATES PATENTS

| | | | |
|---|---|---|---|
| 201,589 | 3/1878 | Blair | 65—109 |
| 1,445,641 | 2/1923 | Nowak | 65—282 X |
| 1,501,773 | 7/1924 | Headley et al. | 65—244 |
| 2,475,915 | 7/1949 | Orr | 65—109 |
| 2,636,752 | 4/1953 | Schane et al. | 285—189 |
| 3,072,421 | 1/1963 | Lloyd et al. | 285—189 |
| 3,169,847 | 2/1965 | Condon | 65—282 |

DONALL H. SYLVESTER, *Primary Examiner.*
A. D. KELLOGG, *Assistant Examiner.*